United States Patent

Woodell et al.

(10) Patent No.: US 7,379,014 B1
(45) Date of Patent: May 27, 2008

(54) TAXI OBSTACLE DETECTING RADAR

(75) Inventors: Daniel L. Woodell, Robins, IA (US); Roy E. Robertson, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 52 days.

(21) Appl. No.: 10/941,616

(22) Filed: Sep. 15, 2004

(51) Int. Cl.
G01S 13/00 (2006.01)
G08G 1/16 (2006.01)

(52) U.S. Cl. ........................ 342/29; 701/301

(58) Field of Classification Search ............ 342/29–32, 342/36–37, 63, 64, 107–109, 113–114, 159–162; 701/301
See application file for complete search history.

(56) References Cited

U.S. PATENT DOCUMENTS

| | | | |
|---|---|---|---|
| 3,535,528 A * | 10/1970 | Strickland | 250/210 |
| 5,534,873 A * | 7/1996 | Weichman et al. | 342/165 |
| 6,388,607 B1 | 5/2002 | Woodell | |
| 6,424,288 B1 | 7/2002 | Woodell | |
| 6,597,305 B2 | 7/2003 | Szeto et al. | |
| 6,603,425 B1 | 8/2003 | Woodell | |
| 6,850,185 B1 * | 2/2005 | Woodell | 342/30 |
| 6,963,301 B2 * | 11/2005 | Schantz et al. | 342/125 |
| 2004/0032363 A1 * | 2/2004 | Schantz et al. | 342/127 |
| 2005/0046608 A1 * | 3/2005 | Schantz et al. | 342/127 |

OTHER PUBLICATIONS

Bu. Pedestrian Detection in Transit Bus Application: Sensing Technologies and Safety Solutions. Jun. 2005, IEEE. pp. 100-105.*

Patent Application for "Runway Obstacle Detection System and Method" by Daniel L. Woodell, U.S. Appl. No. 10/631,316, filed on Jul. 31, 2003.

"Runway Incursion Prevention System Simulation Evaluation" by Denise R. Jones, presented at 21st Digital Avionics Conference Irvine, CA, Oct. 27-31, 2002.

"Runway Incursion Prevention: A Technology Solution" by S. D. Young et al. presented at the Joint Meeting of the Flight Safety Foundation's 54th Annual International Air Safety Seminar, the International Federation of Airworthiness' 31st International Conference, and the International Air Transport Association, Athens, Greece, Nov. 5-8, 2001.

* cited by examiner

*Primary Examiner*—Thomas H. Tarcza
*Assistant Examiner*—Shelley Chen
(74) *Attorney, Agent, or Firm*—Nathan O. Jensen; Kyle Eppele

(57) ABSTRACT

A weather radar for detecting taxi obstacles has a transmitter for transmitting intermixed short-range pulses to detect short-range stationary objects and longer-range Doppler pulses to detect long-range moving targets. A receiver receives short-range return pulses from the short-range stationary objects and longer-range Doppler return pulses from the long-range moving targets. A processor is connected to the transmitter and receiver for generating the intermixed short-range pulses and longer-range Doppler pulses and for processing short-range return pulses and longer-range Doppler return pulses. A display displays detected short-range stationary objects and longer-range moving targets.

53 Claims, 5 Drawing Sheets

TAXI OBSTACLE DETECTING RADAR

CROSS REFERENCE TO RELATED APPLICATIONS

The present application is related to co-pending application Ser. No. 10/631,316 filed on Jul. 31, 2003 entitled "Runway Obstacle Detection System and Method" by Daniel L. Woodell. The co-pending application is assigned to the assignee of the present invention.

BACKGROUND OF THE INVENTION

This invention relates to weather radar, aircraft runaway incursions, and specifically for a weather radar for the detection and alerting of the presence of obstacles during taxi operations.

Accidents during surface operations remain one of the last largely unsolved problems of the air transport system. Both the US government and resources from a number of companies are moving to meet this challenge. Many have suggested solutions that require controlled environments, ground equipment, or equipment on all vehicles or structures that may be involved in an accident. Counting on these external requirements always being in place insures some situations will never be covered, even in a regulatory rich environment such as North America. Second and third world operations with their historically poorer infrastructure and minimally equipped aircraft will see a much higher rate of situations where an aircraft that is equipped with hazard detecting equipment that requires external help may still have an avoidable accident. The real challenge is to make an aircraft safe in all environments. This forces at least some portions of the system to be autonomous.

A representative system under development is a ground-based system that requires either surface movement radar and/or multilateration receivers processing L-band returns from aircraft. Multilateration is a process of solving for the position of a transmitter on board an aircraft by measuring the transmitter pulse arrival time to geographically diverse sets of ground-based receivers whose positions are known. Since this system is ground based, it does not allow the aircraft to operate autonomously. Secondly, since this multilateration system tracks targets by L-band emissions, targets without a transponder are not detectable.

NASA is developing a system called RIPS (Runway Incursion Prevention System) that is based on ADS-B (automatic dependent surveillance-broadcast) equipped aircraft, an airport database, and an L-band data path. Both obstacle awareness and position awareness are provided with this system. Although this system can be carried on an aircraft, targets to be avoided must cooperate by squittering their position at L-Band. Any object without GPS position and an L-band transmitter will not be tracked.

FLIR (forward looking infrared) cameras have been tested with both single and multiple IR bands. This solution does not require cooperation from a viewed target but does not work in some fog situations. Millimeter wave systems have been demonstrated from several vendors but again they may be challenged with fog and cloud cover in the passive systems while the active systems are heavily attenuated in rain. Both the IR and millimeter wave systems are costly and also carry a new maintenance burden as airline operators try to maintain the new higher frequency equipment and new IR window or dual-band millimeter wave capable radomes.

Another representative system is an add-on to an enhanced ground proximity warning system (EGPWS). This system produces database driven audio annunciation of impending transitions of runways and taxiways. This system's strong point is improving the pilot's awareness of own aircraft location. Thus the system is useful in helping an equipped aircraft from making a mistake that causes an accident. This system's weak point is in only annunciating runway/taxiway transitions, it does not directly detect threats. Thus this system will not protect the aircraft from someone else who makes a mistake or obstacles that are not contained in the database. In addition this system frequently annunciates with an audio message whether a threat exists or not. This approach will violate the dark/quiet cockpit philosophy and may lead the pilot to discount an accident avoiding annunciation since the system is producing annunciations that are discounted all the time.

The aircraft ground movement problem can be separated into two components, position awareness and threat awareness. Position awareness aids the pilot in not putting his aircraft in the wrong place where it can be threatened or become a threat to another aircraft. Threat awareness is looking out for other aircraft and obstacles that are in a wrong or unexpected position. The EPGWS-based system described above is for improved position awareness. A HUD-driven taxi guidance system is proposed to keep the aircraft where it should be. Assuming a guidance or position awareness system, such as these, is included in new aircraft, the problem becomes one of detection and annunciation of threats.

Threat detection solutions fall into two broad categories; cooperative and non-cooperative. Cooperative detection of hazards requires that a potential hazard be actively involved in the detection process. Examples include the L-band multilateration driven system and the GPS position annunciating NASA RIPS system previously described. On the other hand, the FLIR, radar, and millimeter wave systems do not require cooperation from a target.

Threat detection systems may be evaluated by their detection rate, false alarm rate, and accuracy of the threat prediction. A cooperative system's miss rate should be dominated by the number of obstacles that for any reason do not cooperate as desired. Unintended objects on the runways that were never expected to cooperate or aircraft with missing or broken equipment are examples of obstacles that would produce misses. Assuming all obstacles are equipped to cooperate, very high detection rates are achievable and this will aid certification of a cooperative system. Non-cooperative systems have their miss rate dominated by their detection miss rate. High detection rates for non-cooperative systems come at the cost of false alarms. This may make certification somewhat of a challenge for any non-cooperative sensor system unless the environmental and target conditions are limited during certification as was done in certification standards for windshear detecting weather radar.

Both cooperative and non-cooperative systems face challenges. Since a RIPS or HUD taxi guidance system can provide taxi guidance and position awareness along with low installed weight and cost, it is likely to be part of a solution. So the problem that remains is that of obstacles and aircraft not being equipped to cooperate or not in the current database. A non-cooperative system can fill this detection void.

Non-cooperative threat sensors include cameras (visual, low light, millimeter wave, and infrared) and radars (microwave, millimeter wave, and laser). As previously discussed, cameras, whether low light, infrared, millimeter wave, or visual, all fail under some precipitation situations that pilots would call benign. Both millimeter and laser radars do not work in moderate to high rain rate situations. An ideal sensor would be low cost or already on the aircraft and work in all environmental conditions.

Ground movement threat assessment may be broken into two problems, short-range obstacles and longer range moving obstacles. The short-range problem is one of providing the pilot with timely information to allow the aircraft to be braked to a stop. Short-range targets may be either moving or non-moving. The inclusion of non-moving targets brings a potentially higher false alarm opportunity unless a database is used to qualify which targets are in the taxi path of the aircraft. The longer-range problem only addresses moving targets. Targets at range that are not closing are not a threat.

What is needed is a reliable low-cost autonomous system for detection and alerting of the presence of obstacles during taxi operations under all weather conditions.

SUMMARY OF THE INVENTION

A weather radar for detecting taxi obstacles is disclosed. The weather radar for detecting taxi obstacles comprises a transmitter for transmitting intermixed short-range pulses to detect short-range stationary objects and longer-range Doppler pulses to detect long-range moving targets. A receiver receives short-range return pulses from the short-range stationary objects and longer-range Doppler return pulses from the long-range moving targets. A processor is connected to the transmitter and receiver to generate the intermixed short-range pulses and longer-range Doppler pulses and to process short-range return pulses and longer-range Doppler return pulses. A display is connected to the processor and displays detected short-range stationary objects and longer-range moving targets.

The weather radar for detecting taxi obstacles use a broadband IF amplifier to amplify the short-range return pulses in the receiver.

In the weather radar for detecting taxi obstacles a warning is produced of a short-range stationary object when a deceleration needed by an aircraft to miss the detected short-range stationary object exceeds a threshold value. The threshold value is based on the aircraft capability to stop or a preset amount of deceleration passengers are comfortable with. A warning is produced of a short-range stationary object when an acceleration driven by a turn needed by an aircraft to miss the detected short-range stationary object exceeds a threshold value while turning the aircraft.

A database with known targets having known positions may be used to reduce positional uncertainty of the stationary object by associating radar detections with the known positions to reduce false alarm rates.

The receiver in the weather radar for detecting taxi obstacles further comprises an IF amplifier to amplify the longer-range Doppler return pulses. The processor separates clutter from Doppler signatures when processing the longer-range Doppler return pulses. A Doppler closing rate indicates detection of a target and presence of a possible incursion. Peak spotting may be is used to estimate an azimuth angle to the detected target to separate a target landing on a runway from a target on an adjacent taxiway. A clutter frequency is estimated from an aircraft inertial platform velocity estimate or by clutter locking the system to identify an estimated ground return frequency from a majority of ranges as being produced by ground returns. In the weather radar for detecting taxi obstacles targets producing Doppler frequencies the same or more negative than the estimated ground return frequency are ignored. Targets producing positive Doppler signatures relative to the estimated ground return frequency are closing targets and potential hazards.

In the weather radar for detecting taxi obstacles a bearing to closing targets is tracked over time to generate a state model with velocity, acceleration, heading, range and bearing for an aircraft in the processor from each target and used with the aircraft state to predict potential collisions.

Radar target alert information is summed in the processor with ground based incursion information received over a datalink at an aircraft to decrease a total system obstacle miss rate.

In the weather radar for detecting taxi obstacles impending threats are annunciated with an icon on the display or with a visual or audio warning.

It is an object of the present invention to provide a reliable low-cost autonomous system for detection and alerting of the presence of obstacles during taxi operations under all weather conditions.

It is an object of the present invention to provide a weather radar for taxi obstacle detection with minimal modifications to existing designs.

It is an advantage of the present invention to provide a weather radar with split detection ranges of short-pulse/short range and longer-range Doppler pulses to allow the radar to deal with the problem cheaply.

It is an advantage of the present invention to produce the lowest target miss rate possible in all environments.

It is a feature of the present invention to solve the ground movement problem when added to existing or pending taxi guidance systems.

It is a feature of the present invention to provide short and long-range modes without the need for expensive additions to new radar designs.

BRIEF DESCRIPTION OF THE DRAWINGS

The invention may be more fully understood by reading the following description of the preferred embodiments of the invention in conjunction with the appended drawings wherein.

DETAILED DESCRIPTION

The present invention is for a weather radar system used for obstacle detection during taxi operations. A weather radar that is already on-board aircraft such as commercial airliners may be modified or a new weather radar developed to detect ground obstacles. The weather radar of the present invention uses a short-range (short transmitter pulse) detector and a longer-range Doppler-aided closing target detector. Weather radar may be used for obstacle detection during taxi operations since the weather function is generally either not being used or if used the update rate for weather information may be very slow.

Figure 1:
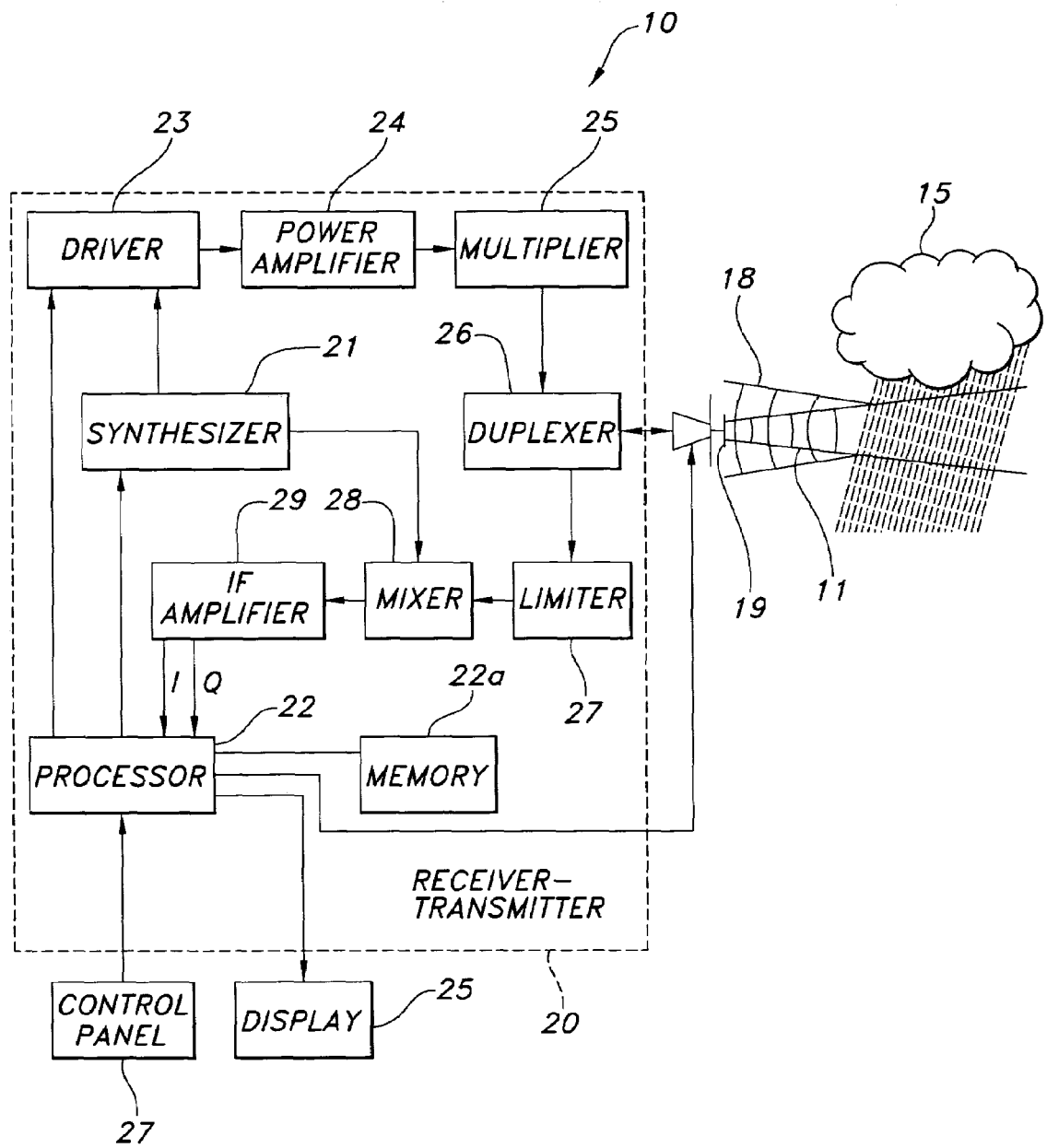
FIG. 1 is a block diagram of a weather radar known in the art.

Weather radars are known in the art for detecting severe weather and for providing a flight crew in an aircraft a two dimensional map display showing range bearing and intensity of detected weather patterns. Flight hazards due to weather conditions are primarily the result of precipitation and turbulence. A block diagram of a representative weather radar 10 that may be modified for obstacle detection during taxi operations is shown in FIG. 1. The weather radar 10 may be a WXR-2100 Weather Radar System manufactured by Rockwell Collins Inc. and used herein as an exemplary weather radar system for modification to incorporate the present invention.

In FIG. 1 pulses 11 are transmitted from the weather radar system 10 using antenna 19, reflected from a target such as a thunderstorm 15 as return pulses 18 and received by the antenna 19. Within a receiver-transmitter 20 the transmitted pulses 11 are generated using a reference signal from a synthesizer 21. The pulse width and pulse repetition frequency (PRF) of the pulses 11 are generated in a driver 23 and controlled by a processor 22. The pulses 11 are amplified in power amplifier 24 and multiplied to a final transmit frequency in multiplier 25. A duplexer 26 directs the multiplier 25 output to the antenna 19.

The return pulses 18 are received and pass through the duplexer 26 to a limiter 27 where strong return pulses 18 are attenuated. The output of the limiter 27 is passed to a mixer 28 where the reflected pulses 18 are down converted in frequency by mixing with a oscillator signal from the synthesizer 21 to produce an intermediate frequency (IF) return signal.

The IF return signal is converted into in-phase (I) and quadrature (Q) components and digitized. The digital return signals are then processed by processor 22. The processor 22 uses a series of algorithms to determine the magnitude, spectral width, and velocity of each return pulse 18.

The results of the processed returns are then encoded to a serial data word that is sent to a system display 25. Encoded in the serial data word is the reflectivity data and message information to be displayed to the flight crew.

A weather radar system control panel 27 provides control signals to the weather radar system receiver-transmitter 20. Depending upon the weather radar system configuration, the control panel 27 provides operating mode selection, ground clutter suppression selection, system select, antenna tilt control in manual mode, and system gain control.

The exemplary WXR-2100 Multiscan Weather Radar System is capable of operating in an automatic mode that controls the weather radar system gain and antenna tilt functions over multiple tilt settings, storing the individual scan data in a memory 22a of the system receiver-transmitter 20. This scan data is continually refreshed and corrected for aircraft motion. The data sent to the system display 25 is a composite of multiple scans that have been processed to remove ground clutter and refine the image. This operation optimizes the display images shown to a flight crew by showing short, mid, and long range weather targets. This weather radar operation is described in U.S. Pat. No. 6,424,288 "Multi-sweep Method and System for Detecting and Displaying Weather Information on a Weather Radar System" and U.S. Pat. No. 6,603,425 "Method and System for Suppressing Ground Clutter Returns on an Airborne Weather Radar" both invented by Daniel L. Woodell, assigned to the assignee of the present invention, and incorporated herein by reference.

The amount of energy returned in the return pulses 18 depends on the reflective quality of a target 15. When short pulses strike the target 15 such as precipitation, some of the energy is absorbed, some of it is refracted, and the remainder is reflected. Heavy rainfall produces the strongest reflections, light rainfall, snow, and ice crystals produce weak returns.

The strength of the return pulses 18 is also related to the distance the pulses must travel. Radar systems compensate for the attenuation of the signal due to the distance traveled with a sensitivity time control (STC) function (not shown). The STC function controls receiver sensitivity with respect to time and thus range. The receiver sensitivity increases during the period between transmitted pulses 11 when the receiver is listening for return pulses 18.

The return pulses 18 provide strength information and range of a target. The range of the target 15 is determined by the amount of elapsed time that occurs between the transmission of a pulse 11 and the reception of the reflected or return pulse 18. The direction or azimuth bearing of the target is determined by noting the azimuth pointing position of the antenna 19. Bearing and range information is then coupled with the reflectivity information and applied to the display 25.

The pulse width transmitted is selected based upon the selected range and mode of operation. By using multiple pulse widths, the receiver-transmitter 20 can optimize the operation of the system for a particular range and operation mode. This optimization provides a better resolution in the weather target display 25 and efficient use of the transmitted energy. Another factor selected in the receiver-transmitter 20 to optimize performance is the pulse repetition frequency (PRF). At shorter selected ranges, the receiver portion of the receiver-transmitter 20 is not required to listen for relatively long periods of time. The transmitter is then free to increase the number of transmitted pulses 11. The greater number of transmitted pulses 11 provides more information and a faster update of weather targets 15 present.

Figure 2:
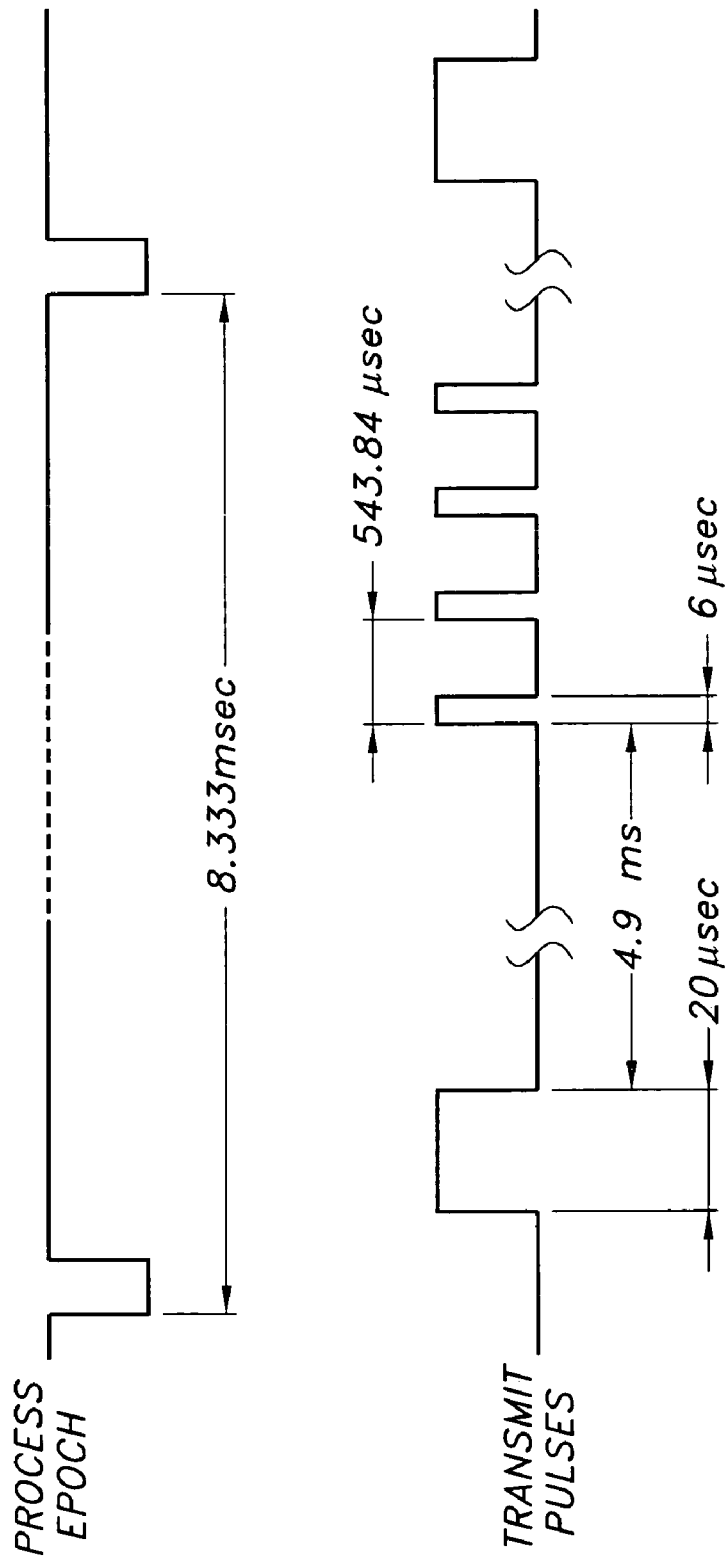
FIG. 2 is a transmit pulse waveform of the weather radar of FIG. 1.

A typical pattern of transmitted pulses 11 for non-windshear operation in the weather radar system 10 is shown in FIG. 2. For any selected range one 20-microsecond pulse and four 6-microsecond pulses are transmitted during each process epoch of 8.333 milliseconds in this example. After transmitting the 20-microsecond pulse there is a 4.9-millisecond space. This allows returns from targets 15 as far away as 331 nautical miles. A process epoch is the time interval in which a radial of radar data is processed. This time is equal to the size of the radar processing element in degrees divided by the antenna 19 scan rate. This pulse pattern is transmitted at each radial of the antenna 19 scan. The transmitted frequency alternates between four weather transmit channel frequencies. For example, the weather radar system 10 is operating in a weather detection mode and the antenna 19 is scanning clockwise. At the 0 degree radial the transmitter transmits the pulse pattern of FIG. 2 at a first transmit channel frequency of four frequencies. At the completion of that epoch the antenna 19 moves a quarter degree clockwise and the pulse pattern is transmitted again at one of three remaining frequencies. At the next quarter degree radial of the antenna 19, the transmit pulse pattern is repeated at one of the remaining two transmit frequencies. The pulse pattern and four frequencies are used for all non-windshear modes of operation such as weather, turbulence, weather plus turbulence, and ground mapping detection.

The weather radar system 10 is capable of Doppler processing of transmit and receive signals for identification of turbulent areas. A greater number of pulses (increased PRF) are used when Doppler processing. The frequency of the return signal is offset from the transmitted frequency because of the Doppler shift caused by the velocity of an aircraft with respect to the target 15. In addition to the frequency shift caused by the aircraft velocity, a frequency shift is caused by the movement of the precipitation. To measure the spectrum width of the frequency shifts caused by precipitation movement, the Doppler shift due to the aircraft must be filtered out. A turbulent target 15 exhibits a wide variance in particle velocities producing a spectrum of velocities. A threshold of turbulent targets is precipitation velocities of about 5 meters per second resulting in a Doppler shift of 312.5 Hz of the transmitted frequency.

Figure 3:
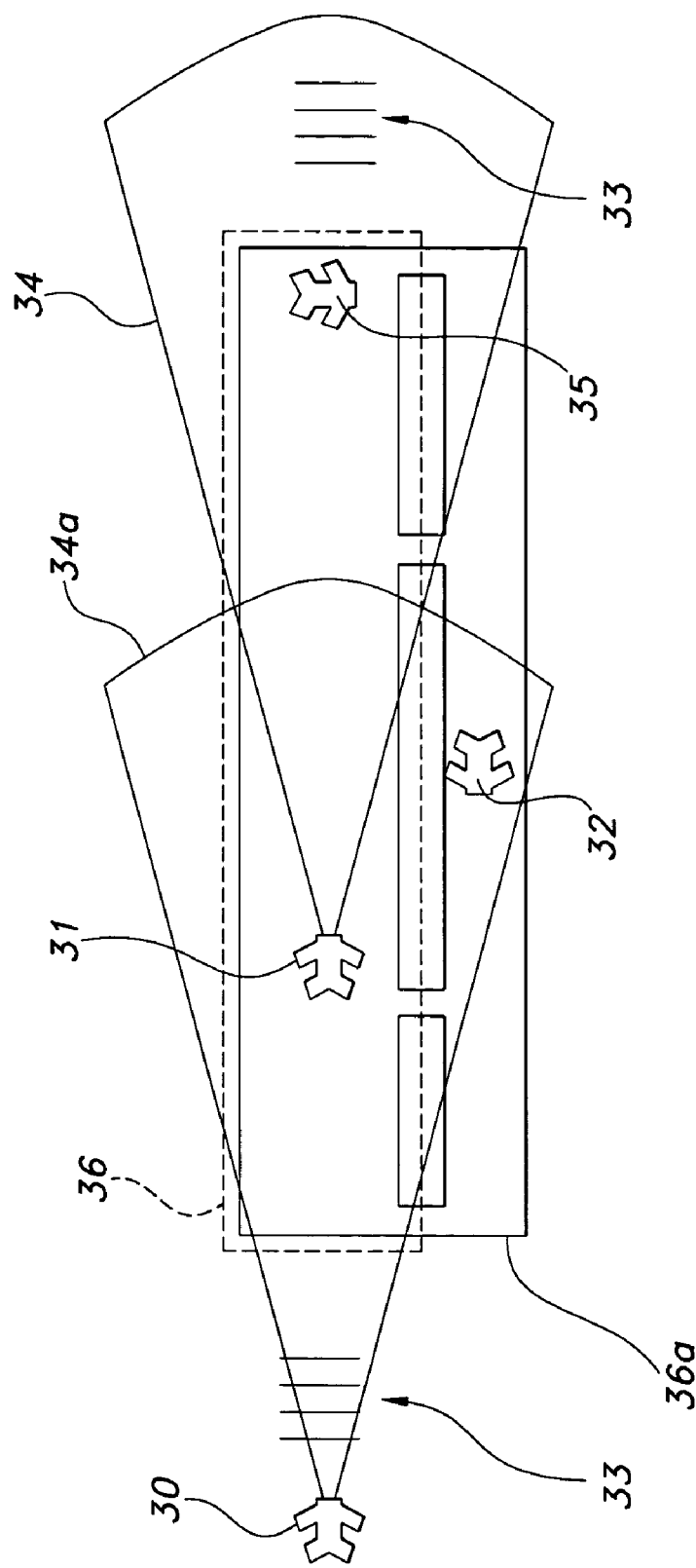
FIG. 3 is a diagram showing an airport runaway and taxiway having obstacles that must be detected.

Obstacles to be detected by an aircraft 31 in a taxi mode on a runway 36 using a weather radar beam 34 from a weather radar system may be separated into two types, short-range stationary such as runway lights 33 and longer range moving obstacles such as other aircraft 32 on taxiway 36a and aircraft 35 on the runway 36 as shown in FIG. 3. Five types of taxi incidents have been identified in historical data; an aircraft 31 taxing into stationary objects 33, aircraft 31 taxing into another aircraft 35 that is in taxi, going nose to nose with an aircraft (not shown) on takeoff roll, going nose to nose with an aircraft (not shown) that is landing, and aircraft 31 being landed on by aircraft 30 while in taxi. The first four of these problems can be solved with the present invention. The threat to the taxing aircraft 31 in the last situation can not be detected by the radar when both aircraft 30 and 31 are moving in the same direction.

Short-range detection of stationary objects may be performed with a short-pulse radar mode without any compression or antenna beamwidth sharpening technology. Short-pulse radars such as this are limited in both loop gain and in signal-to-clutter ratios available with their allocated frequency bandwidth. Intermixed with the short-pulse mode is a Doppler-sampled longer-pulse/lower-bandwidth mode that may look for high closing rate targets at ranges in excess of the short-pulse maximum detection range. This intermix allows the short-range mode to be simple and inexpensive since all closing rate targets that require more detection range to avoid an accident are handed off to a clutter removing intermixed Doppler mode. The longer-range Doppler mode uses pulse widths that do not allow for the detection of stationary objects at very short ranges. Therefore the two intermixed radar modes are complementary in a taxi obstacle detecting radar of the present invention.

Figure 4:
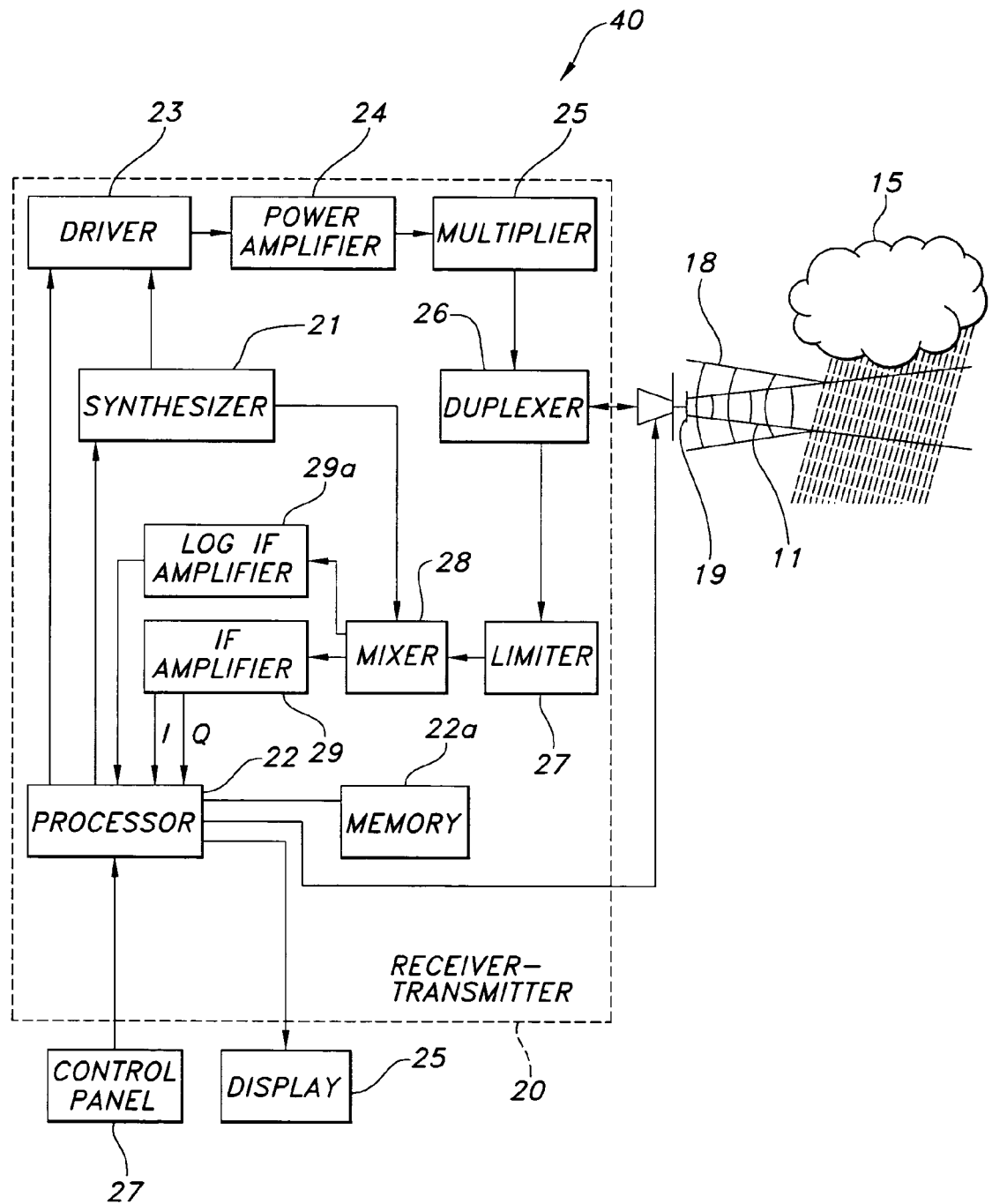
FIG. 4 is a block diagram of a taxi obstacle detecting weather radar of the present invention showing changes to the weather radar of FIG. 1.

The weather radar 10 of FIG. 1 is modified into the taxi obstacle weather radar 40 of the present invention as shown in FIG. 4. A short-range (short transmitter pulse) detector operational mode for detection of stationary targets and longer-range Doppler-aided closing target detector operational mode are added to the weather radar 10 of FIG. 1. These two operational modes are complementary to a longer range landing and takeoff incursion detection mode disclosed in co-pending application 03CR095/KE where long-range targets must be separated from stationary clutter. The short-range and longer-range Doppler-aided operational modes are intermixed by transmitting short pulses and long pulses in the same process epoch. The short-range taxi and Doppler closing modes may be implemented by minimally modified commercial weather radars while the longer range landing and takeoff modes in the co-pending application require a non-standard antenna to separate targets in azimuth.

The short-range detector operational mode utilizes most of the elements of the weather radar system 10 shown in FIG. 1 and is optimized for very short range operation. The taxi obstacle detecting radar 40 shown in FIG. 4 uses elements of the radar system 10 shown in FIG. 1 such as the antenna 19, receiver-transmitter 20, control panel 27, and display 25. Since the short-range mode does not require Doppler separation of returns, a broadband IF amplifier than may be a log IF amplifier 29a is added in the receiver-transmitter 20 connected to the mixer 28 with an output to the processor 22 for processing short-range return pulses.

The longer-range Doppler detector is implemented in FIG. 4 with the standard components of the Doppler weather radar system 10 of FIG. 1 including the antenna 19, receiver-transmitter 20, processor 22, control panel 27, and display 25. The processor 22 processes the longer-range Doppler return pulses.

Figure 5:
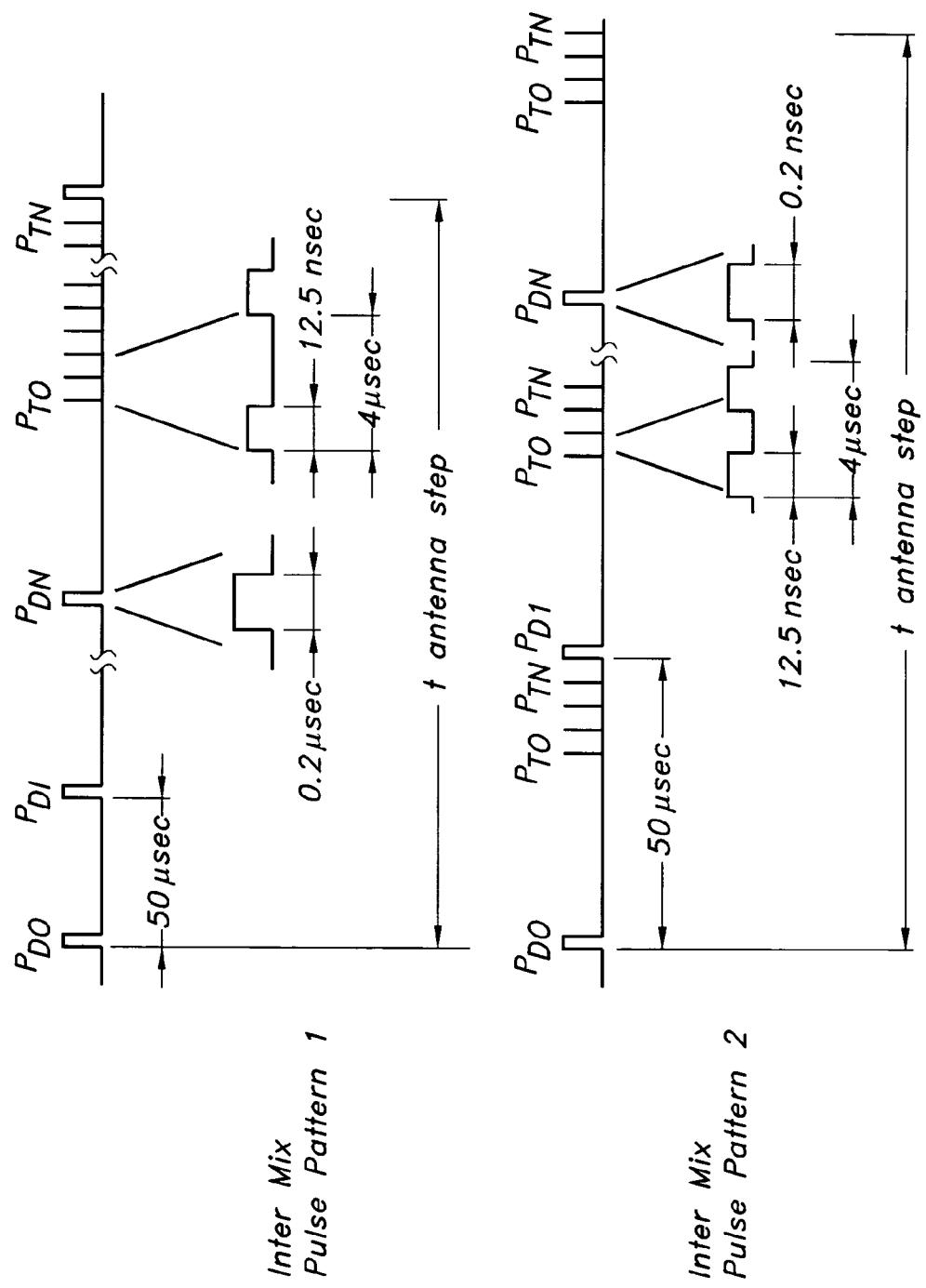
FIG. 5 shown exemplary transmit pulse patterns that may be used in the taxi obstacle radar of FIG. 4.

Exemplary transmit pulse patterns that may be used in the taxi obstacle weather radar 40 of the present invention are shown in FIG. 5. Other transmit pulse patterns, pulse widths, and pulse repetition rates may also be used. Processor 22 generates the pulse patterns. In FIG. 5 longer-range Doppler pulses $P_{D0}$, $P_{D1}$ to $P_{DN}$ are intermixed with short-range pulses $P_{T0}$ to $P_{TN}$. In intermix pulse pattern 1 the longer-range Doppler pulses $P_{D0}$, $P_{D1}$ to $P_{DN}$ are 0.2-microseconds wide and spaced at 50-microsecond intervals. The short-range pulses $P_{T0}$ to $P_{TN}$ are transmitted near the end of one antenna step period or process epoch. The short-range pulses are 12.5-nanoseconds wide and transmitted at 4-microsecond intervals.

In intermix pulse pattern 2 of FIG. 5, the same pulse widths and pulse repetition rates (PRF) as in intermix pulse pattern 1 are used for both the short-range and longer-range Doppler pulses. The short-range pulses are placed between the longer-range Doppler pulses with fewer short-range pulses used in each short-range pulse group.

In the taxi obstacle weather radar 40 in FIG. 4, the receiver bandwidth is increased to 80 MHz in the log IF amplifier 29a to accommodate the short-range pulse ($P_{T0}$ to $P_{TN}$) width of 12.5 nanoseconds shown in FIG. 5. A very high PRF is used for the short-range pulses to generate many pulse returns per processing epoch. With a maximum range of the short-range detector in the hundreds of meters, PRFs of 250 kHz can readily be used. With a slight random spacing of transmitter pulses, interfering radars with the same pulse pattern will produce only a noise-like rate of return in all range bins. In the same fashion multiple trip echoes will also produce only noise-like returns per range bin. Consistent target responses on the other hand will fall at a high rate into the same bin. This allows detection of targets even in the face of heavy interference.

In the taxi obstacle weather radar 40 in FIG. 4 the longer-range Doppler detector uses existing weather radar circuitry including IF amplifier 29 using a receiver bandwidth of 5 MHz to match the 0.2-microsecond transmitter pulse for the longer-range Doppler pulses $P_{D0}$, $P_{D1}$ to $P_{DN}$.

A 128-pulse integration interval for the Doppler-aided sensing and the short-range taxi pulse set must fit within a nominal multiscan antenna step period of $\frac{1}{120}$ second (8.333 msec) that is the process epoch of FIG. 2. Assume the Doppler pulses happen at a 4 nautical mile interval. Where CPI (coherent process interval) is $$CPI = 128(4)(12.36 \cdot 10^6) = 6.328 \cdot 10^3 \text{ sec.}$$

This leaves the following time for the short-range mode $$t_{short} = 1/120 - CPI = 2.005 \cdot 10^{-3} \text{ sec.}$$

This is enough time for several hundred 2.5- to 4-microsecond short-pulse intervals to occur. The Doppler function fits in 0.375 degree antenna sweep with room for the short-range mode.

Warnings produced by the short-range detector are based on the deceleration needed by the aircraft 31 in FIG. 3 to miss a detected target exceeding a threshold value. With a given detection latency and aircraft velocity, the g level required to stop before hitting a target in front of aircraft 31 may be computed. When this avoidance g level exceeds a fixed threshold, a caution or warning may be issued. The g threshold value may be based on either the aircraft 31 capability to stop or the preset amount of deceleration passengers are comfortable with. Using deceleration required to miss a target allows the aircraft 31 to move slowly through very target dense environments without false alarms. As an example consider a target such as runway lights 33 directly in front of the aircraft 31. Assuming eight-second latency for the radar plus two-second pilot reaction speed, and ¼-g braking deceleration, the aircraft 31 can stop in less than 50 meters from a taxi speed of 30 knots. If a maximum range of the short-range detector is about 200 meters, antenna 19 beam widths without antenna sharpening produce an acceptably narrow region of detection.

In the same fashion, targets may be missed by turning the aircraft 31. An acceleration limit can be used, this time acceleration driven by a turn. This should allow the aircraft 31 to taxi, turn, and coexist in normal operation while warning only in situations where there is an impending collision that must be avoided with a lateral or deceleration escape maneuver exceeding a threshold value.

False alarm rates for the taxi obstacle weather radar 40 can be reduced by reducing the stationary object's positional uncertainty by associating radar detections with known stationary objects with known positions taken from a database or target list in memory 22a. In the case where the taxi obstacle weather radar 40 does not detect the object, the summation of warnings produced from the weather radar 40 derived acceleration limits with similar warnings derived from aircraft heading, position, velocity, and a target's position taken from either a database or target list can provide a low target miss rate.

Man or baggage cart sized obstacles should be detectable with the taxi obstacle weather radar 40 of the present invention to ranges past 200 meters and provide reliable detection in rain with rain rates up to ½ inch per hour.

Referring again to FIG. 3, since the maximum range for the short-range mode has been estimated to be about 200 meters, knowing some runway 36 and taxiway 36a characteristics stored in the database, the azimuth resolution requirement may be estimated next. Runway incursions must be detected at a maximum range. Aircraft 32 waiting on the taxiway 36a must not be detected. Any target such as aircraft 35 within about 50 feet of the runway 36 should be detected. This requires an azimuth resolution of 5.831 degrees. Targets this far out in angle space are over 50-dB down in response. This means that a 50 dB target 4.3 degrees away from a desired target masks the desired target making it undetectable. Targets with a radar cross section smaller than 50 dB larger that targets the radar system 40 is designed to detect are tolerated in the sidelobes of the radar antenna 19 without either being detected or masking a desired target such as aircraft 35. Targets such as aircraft 32 larger than this in the sidelobes are detected but post processing can remove them by noting their incorrect translation these detected targets exhibit as the aircraft 32 moves. Single epoch target masking is also a possibility with these large sidelobe targets but this is not a problem since detection is desired at the same range of the masking target.

Ranges need to include as a minimum, the length from one runway 36 end to the other. Maximum range may include an additional three or four kilometers to allow aircraft to be detected while they are on approach. The longer-range mode is Doppler-aided to separate moving targets from stationary clutter. The smallest targets of interest are light aircraft. Assume a moving target aircraft 35 in FIG. 3 must be seen at the end of a 9000 foot runway 36. The minimum range detectable for this mode may be computed knowing the transmitter pulse length and assuming a four-pulse length recovery time to be 120 meters or 393.7 feet. The minimum detection range is closer than the maximum range of the short-pulse mode when the short pulse range is 200 meters.

Targets the size of light aircraft may be spotted at two nautical miles in rain rates less than ½-inch per hour with the Doppler-aided closing target detector in the taxi obstacle weather radar 40 of the present invention. Again an airport database would be useful but targets showing a sustained closing range on a collision course with the equipped aircraft should be alerted against.

Knowing some runway 36 in FIG. 3 characteristics and target characteristics, the azimuth resolution requirement may be estimated for the Doppler mode in aircraft 31. First, targets are separated from clutter by means of Doppler signatures. If there is a Doppler closing rate, there is detection of a target such as aircraft 32 and an incursion may exist. Second, closing incursions must be detected at maximum possible range to allow the maximum amount of time to get out of the way or to alert the threat aircraft 32. This would seem to require the system to be able to reject by angular resolution a closing target aircraft 32 on adjacent taxiway 36a to the aircraft 31 equipped with the taxi obstacle weather radar 40 on the runway 36. Peak spotting may be used to estimate the angle to the detected target. Detection of the peak of the return in azimuth allows the azimuth resolution needed to separate the target 32 on the taxiway 36a adjacent to the runway 36. This estimated azimuth can then be used to determine if the closing target 32 is on the aircraft 31 runway 36 or taxiway 36a. If another aircraft (not shown) is in a same Doppler bin as the target 32 on the adjacent taxiway 36a but is on the equipped aircraft 31 runway 36, the angle estimate fails but this is not a concern since the equipped aircraft 31 must still get out of the way.

A clutter frequency can either be estimated from an aircraft inertial platform velocity estimate or by clutter locking the system. Clutter locking the system refers to identifying a dominate radar return frequency from the majority of ranges as being produced by ground returns. Targets producing Doppler frequencies the same as the estimated ground return frequency may be ignored as well as targets with Doppler frequencies more negative than those produced by ground returns. Targets producing these negative Doppler signatures are moving away from the radar are not a threat. Targets that are closing as indicated by their Doppler signature being positive relative to the ground Doppler signature can be flagged as closing targets and potential hazards.

In operation of the taxi obstacle weather radar 40 of the present invention, short-range pulses are transmitted from the aircraft 31 on the runway 36 along with long-range pulses in the radar beams 34 as shown in FIG. 3 using the intermixed pulse patterns of FIG. 5. The short-range pulses are reflected from some obstacle 33 and returned to radar system 40. The long-range pulses are transmitted along with the short-range pulses from the aircraft 31 and reflected from some moving target such as another aircraft 35. The short-range pulses are received and processed in taxi obstacle weather radar 40 and are shown as an obstacle on display 26.

The long-range pulses are received and processed and shown as a moving obstacle on display 26.

The bearing to closing targets can be tracked over time. A state model (velocity, acceleration, heading, range & bearing) can be generated in processor 22 from each target and then be used with the radar-equipped aircraft's state to predict potential collisions. As an example, a closing target with a constant bearing is on a collision course with the radar equipped aircraft.

Radar target alert information may be summed in processor 22 with ground based incursion information received over a datalink at the aircraft to decrease the total system obstacle miss rate.

Outputs from either the short-range taxi or Doppler closing mode may annunciated to the aircrew is several ways. The taxi obstacle weather radar system 40 may produce a situational display of radar returns, either processed return strength or as an icon on display 25. Impending threats may either be annunciated on the same display 25 or with either a visual warning light or audio warning system (not shown).

The taxi obstacle weather radar 40 of the present invention may be advisory only or an alerting/warning system. Alerting systems most likely require the database to restrict the regions from which warnings may be generated. Work is on-going at NASA with their RIPS program to perform a similar function using GPS and/or ground-base radar sensors. The system will allow the function to be implemented at low cost and to be used autonomously without cooperation from other targets.

The present invention produces the lowest target miss rate possible in all environments. Since the cost growth to the exiting weather radar 10 for a new taxi obstacle weather radar 40 is low to nonexistent, the fusion of weather radar warning data from short and long ranges with RIPS-like data produces a very low system cost on new aircraft. This taxi obstacle weather radar system 40 completes the ground movement problem when added to taxi guidance.

It is believed that the taxi obstacle detecting weather radar of the present invention and many of its attendant advantages will be understood by the foregoing description, and it will be apparent that various changes may be made in the form, construction and arrangement of the components thereof without departing from the scope and spirit of the invention or without sacrificing all of its material advantages, the form herein before described being merely an explanatory embodiment thereof. It is the intention of the following claims to encompass and include such changes.

What is claimed is:

1. A weather radar for detecting taxi obstacles comprising:
   a transmitter for transmitting intermixed short-range pulses to detect short-range stationary objects and longer-range Doppler pulses to detect long-range moving targets;
   a receiver for receiving short-range return pulses from the short-range stationary objects and longer-range Doppler return pulses from the long-range moving targets;
   a processor connected to the transmitter and receiver and for generating the intermixed short-range pulses and longer-range Doppler pulses and for processing short-range return pulses and longer-range Doppler return pulses; and
   a display connected to the processor and to display detected short-range stationary objects and longer-range moving targets.

2. The weather radar for detecting taxi obstacles of claim 1 wherein said receiver further comprises a broadband IF amplifier to amplify the short-range return pulses.

3. The weather radar for detecting taxi obstacles of claim 1 wherein a warning is produced of a detected short-range stationary object when a deceleration needed by an aircraft to miss the detected short-range stationary object exceeds a threshold value.

4. The weather radar for detecting taxi obstacles of claim 3 wherein the threshold value is based on the aircraft capability to stop or a preset amount of deceleration passengers are comfortable with.

5. The weather radar for detecting taxi obstacles of claim 1 wherein a warning is produced of a detected short-range stationary object when an acceleration driven by a turn needed by an aircraft to miss the detected short-range stationary object exceeds a threshold value while turning the aircraft.

6. The weather radar for detecting taxi obstacles of claim 1 further comprising a database with stationary objects having known positions and used to reducing positional uncertainty of the stationary objects by associating radar detections with the known positions to reduce false alarm rates.

7. The weather radar for detecting taxi obstacles of claim 1 wherein when the stationary object is not detected a summation of warnings produced from weather radar derived acceleration limits are combined with warnings derived from aircraft heading, position, velocity, and a stationary object position taken from a database or target list to provide a low target miss rate.

8. The weather radar for detecting taxi obstacles of claim 1 wherein said receiver further comprises an IF amplifier to amplify the return longer-range Doppler pulses.

9. The weather radar for detecting taxi obstacles of claim 1 wherein the processor separates clutter from Doppler signatures when processing the longer-range Doppler return pulses.

10. The weather radar for detecting taxi obstacles of claim 1 wherein a Doppler closing rate indicates detection of a moving target and presence of a possible incursion.

11. The weather radar for detecting taxi obstacles of claim 10 wherein peak spotting is used to estimate an azimuth angle to the detected moving target to separate a target landing on a runway from a target on an adjacent taxiway.

12. The weather radar for detecting taxi obstacles of claim 11 wherein a clutter frequency is estimated from an aircraft inertial platform velocity estimate or by clutter locking the system to identify an estimated ground return frequency from a majority of ranges as being produced by ground returns.

13. The weather radar for detecting taxi obstacles of claim 12 wherein moving targets producing Doppler frequencies the same or more negative than the estimated ground return frequency are ignored.

14. The weather radar for detecting taxi obstacles of claim 12 wherein moving targets producing positive Doppler signatures relative to the estimated ground return frequency are closing targets and potential hazards.

15. The weather radar for detecting taxi obstacles of claim 10 wherein a bearing to closing targets is tracked over time to generate a state model with velocity, acceleration, heading, range and bearing for an aircraft in the processor from each closing target and used with the aircraft state to predict potential collisions.

16. The weather radar for detecting taxi obstacles of claim 1 wherein radar target alert information is summed in the processor with ground based incursion information received over a datalink at an aircraft to decrease a total system obstacle miss rate.

17. The weather radar for detecting taxi obstacles of claim 1 wherein impending threats from the short-range stationary objects and longer-range moving targets are annunciated with an icon on the display or with a visual or audio indication.

18. The weather radar for detecting taxi obstacles of claim 17 wherein the impending threats are annunciated as an advisory.

19. The weather radar for detecting taxi obstacles of claim 17 wherein the impending threats are annunciated as a warning.

20. A method of detecting taxi obstacles with a weather radar comprising the steps of:
transmitting from a transmitter intermixed short-range pulses to detect short-range stationary objects and longer-range Doppler pulses to detect long-range moving targets;
receiving with a receiver short-range return pulses from the short-range stationary objects and longer-range Doppler return pulses from the long-range moving targets;
generating the intermixed short-range pulses and longer-range Doppler pulses with a processor connected to the transmitter and receiver;
processing short-range return pulses and longer-range Doppler return pulses with the processor; and
displaying detected short-range stationary objects and longer-range moving targets with a display connected to the processor.

21. The method of detecting taxi obstacles with a weather radar of claim 20 further comprising the step of producing a warning of a detected short-range stationary object when a deceleration needed by an aircraft to miss the detected short-range stationary object exceeds a threshold value.

22. The method of detecting taxi obstacles with a weather radar of claim 21 further comprising the step of basing the threshold value on the aircraft capability to stop or a preset amount of deceleration passengers are comfortable with.

23. The method of detecting taxi obstacles with a weather radar of claim 20 further comprising the step of producing a warning of a detected short-range stationary object when an acceleration driven by a turn needed by an aircraft to miss the detected short-range stationary object exceeds a threshold value while turning the aircraft.

24. The method of detecting taxi obstacles with a weather radar of claim 20 further comprising the step of using a database with stationary objects having known positions to reduce positional uncertainty of the stationary objects by associating radar detections with the known positions to reduce false alarm rates.

25. The method of detecting taxi obstacles of claim 20 further comprising the step of summing warnings produced from weather radar derived acceleration limits with warnings derived from aircraft heading, position, velocity, and a stationary object position taken from a database or target list if the stationary object is not detected.

26. The method of detecting taxi obstacles with a weather radar of claim 20 further comprising the step of separating clutter from Doppler signatures when processing the longer-range Doppler return pulses in the processor.

27. The method of detecting taxi obstacles with a weather radar of claim 20 further comprising the step of indicating detection of a moving target and presence of a possible incursion with a Doppler closing rate.

28. The method of detecting taxi obstacles with a weather radar of claim 27 further comprising the step of using peak spotting to estimate an azimuth angle to the detected moving target to separate a target landing on a runway from a target on an adjacent taxiway.

29. The method of detecting taxi obstacles with a weather radar of claim 28 further comprising the step of estimating a clutter frequency from an aircraft inertial platform velocity estimate or by clutter locking the system to identify an estimated ground return frequency from a majority of ranges as being produced by ground returns.

30. The method of detecting taxi obstacles with a weather radar of claim 29 further comprising the step of ignoring moving targets producing Doppler frequencies the same or more negative than the estimated ground return frequency.

31. The method of detecting taxi obstacles with a weather radar of claim 29 further comprising the step of identifying moving targets producing positive Doppler signatures relative to the estimated ground return frequency as closing targets and potential hazards.

32. The method of detecting taxi obstacles with a weather radar of claim 20 further comprising the steps of:
tracking a bearing to closing targets over time;
generating a state model with velocity, acceleration, heading, range and bearing for an aircraft in the processor from each closing target; and
using the state model with the aircraft state to predict potential collisions.

33. The method of detecting taxi obstacles with a weather radar of claim 20 further comprising the step of summing radar target alert information in the processor with ground based incursion information received over a datalink at an aircraft to decrease a total system obstacle miss rate.

34. The method of detecting taxi obstacles with a weather radar of claim 20 further comprising the step of annunciating impending threats with an icon on the display or with a visual or audio indication.

35. A weather radar system for detecting taxi obstacles wherein said weather radar system transmits intermixed short-range pulses to detect short-range stationary objects and longer-range Doppler pulses to detect long-range moving targets; receives short-range return pulses from the short-range stationary objects and longer-range Doppler return pulses from the long-range moving targets; processes the short-range return pulses and longer-range Doppler return pulses; and displays detected short-range stationary objects and longer-range moving targets.

36. The weather radar system for detecting taxi obstacles of claim 35 further comprising a transmitter for transmitting the intermixed short-range pulses to detect short-range stationary objects and longer-range Doppler pulses to detect long-range moving targets.

37. The weather radar system for detecting taxi obstacles of claim 36 further comprising a receiver for receiving the short-range return pulses from the short-range stationary objects and longer-range Doppler return pulses from the long-range moving targets.

38. The weather radar system for detecting taxi obstacles of claim 37 further comprising a processor connected to the transmitter and receiver and for generating the intermixed short-range pulses and longer-range Doppler pulses and for processing short-range return pulses and longer-range Doppler return pulses.

39. The weather radar system for detecting taxi obstacles of claim 38 further comprising a display connected to the processor and to display detected short-range stationary objects and longer-range moving targets.

40. The weather radar system for detecting taxi obstacles of claim 35 wherein a warning is produced of a detected short-range stationary object when a deceleration needed by an aircraft to miss the detected short-range stationary object exceeds a threshold value.

41. The weather radar system for detecting taxi obstacles of claim 40 wherein the threshold value is based on the aircraft capability to stop or a preset amount of deceleration passengers are comfortable with.

42. The weather radar system for detecting taxi obstacles of claim 35 wherein a warning is produced of a detected short-range stationary object when an acceleration driven by a turn needed by an aircraft to miss the detected short-range stationary object exceeds a threshold value while turning the aircraft.

43. The weather radar system for detecting taxi obstacles of claim 35 further comprising a database with stationary objects having known positions and used to reducing positional uncertainty of the stationary objects by associating radar detections with the known positions to reduce false alarm rates.

44. The weather radar system for detecting taxi obstacles of claim 35 wherein if the stationary object is not detected warnings produced from weather radar derived acceleration limits are combined with warnings derived from aircraft heading, position, velocity, and a stationary object position taken from a database or target list to provide a low target miss rate.

45. The weather radar system for detecting taxi obstacles of claim 35 wherein the weather radar system separates clutter from Doppler signatures when processing the longer-range Doppler return pulses.

46. The weather radar system for detecting taxi obstacles of claim 35 wherein a Doppler closing rate indicates detection of a moving target and presence of a possible incursion.

47. The weather radar system for detecting taxi obstacles of claim 46 wherein peak spotting is used to estimate an azimuth angle to the detected moving target to separate a target landing on a runway from a target on an adjacent taxiway.

48. The weather radar system for detecting taxi obstacles of claim 47 wherein a clutter frequency is estimated from an aircraft inertial platform velocity estimate or by clutter locking the system to identify an estimated ground return frequency from a majority of ranges as being produced by ground returns.

49. The weather radar system for detecting taxi obstacles of claim 48 wherein moving targets producing Doppler frequencies the same or more negative than the estimated ground return frequency are ignored.

50. The weather radar system for detecting taxi obstacles of claim 48 wherein moving targets producing positive Doppler signatures relative to the estimated ground return frequency are closing targets and potential hazards.

51. The weather radar system for detecting taxi obstacles of claim 46 wherein a bearing to closing targets is tracked over time to generate a state model with velocity, acceleration, heading, range and bearing for an aircraft in the processor from each closing target and used with the aircraft state to predict potential collisions.

52. The weather radar system for detecting taxi obstacles of claim 46 wherein radar target alert information is summed with ground based incursion information received over a datalink at an aircraft to decrease a total system obstacle miss rate.

53. The weather radar system for detecting taxi obstacles of claim 46 wherein impending threats are annunciated with a display icon or with a visual or audio indication.

* * * * *